United States Patent
Frembgen

(10) Patent No.: US 6,444,113 B1
(45) Date of Patent: Sep. 3, 2002

(54) METHOD FOR MANUFACTURING HOLLOW SPACES IN METALLIC WORKPIECES

(76) Inventor: Fritz-Herbert Frembgen, Erfurter Str. 31, 87700, Memmingen (DE)

(*) Notice: Subject to any disclaimer, the term of this patent is extended or adjusted under 35 U.S.C. 154(b) by 0 days.

(21) Appl. No.: 09/644,074

(22) Filed: Aug. 23, 2000

(30) Foreign Application Priority Data

Sep. 2, 1999 (DE) .......................................... 199 41 840

(51) Int. Cl.$^7$ ................................................ B23H 9/00
(52) U.S. Cl. ................................................... 205/670
(58) Field of Search ........................................ 205/670

(56) References Cited

U.S. PATENT DOCUMENTS 4,578,164 A * 3/1986 Matsui et al. ............... 204/670
5,026,462 A * 6/1991 Butterfield et al. ......... 204/670

* cited by examiner

*Primary Examiner*—Nam Nguyen
*Assistant Examiner*—Thomas H. Parsons
(74) *Attorney, Agent, or Firm*—Notaro & Michalos P.C.

(57) ABSTRACT

The invention relates to a method for manufacturing hollow spaces (5) in metallic workpieces (1), especially in fuel injectors for diesel engines with at least one main bore (3) and at least one supply bore (4), especially for fuel supply, wherein at least one electrode (2) is introduced into the main bore (3) and the hollow space (5) and/or the connection to the supply bore (4) is formed by means of an electrolytic erosion process. It is the object of the invention to provide a method by which the use of an additional washing process can be eliminated. The object upon which the invention is based is solved in that the supply bore (4) is flushed at least temporarily with electrolyte.

8 Claims, 2 Drawing Sheets

METHOD FOR MANUFACTURING HOLLOW SPACES IN METALLIC WORKPIECES

BACKGROUND OF THE INVENTION

1. Field of the Invention

The invention relates to a method for manufacturing hollow spaces in metallic workpieces, especially in fuel injectors for diesel engines with at least one main bore and at least one supply bore, especially for the fuel supply, wherein at least one electrode is introduced into the main bore and the hollow space and/or the connection to the supply bore is formed by means of an electrolytic erosion process.

2. Description of the Related Art

In a known manufacturing process for fuel injectors, a main bore is produced in the workpiece. Subsequently, the manufacture of the supply bore takes place. The nominal diameter of the supply bore of the fuel injectors for diesel engines with minimal power output is often less than 1 millimeter. During the manufacturing process, contaminants such as oil residues from drilling or small metal shavings are introduced into the supply bore and into the main bore. For an electrolytic erosion process, it is necessary that the main bore and the supply bore are free of contaminants because the latter form an insulation layer on the metal surface so that during the electrolytic erosion process a non-uniform erosion of metal takes place.

In order to prevent these negative results, the workpiece, after producing the bores, is freed of contaminants by time-intensive and cost-intensive washing processes. Due to the often very minimal diameter of the supply bore, the effect of capillary forces is especially great. Oil residues can be removed only by a very complex washing process at high-pressure and by employing expensive detergents. After the washing processes, the supply bore is then sealed to the exterior and the actual electrolytic erosion process begins. A voltage is applied to the electrode positioned in the main bore. The electrolyte liquid is then supplied via the electrode, metal is removed, and the electrolyte liquid is then removed completely through the main bore. This process is continued until the hollow space has reached the desired size and a connection between the main bore and the supply bore is present.

SUMMARY OF THE INVENTION

It is an object of the invention to provide a method with which the use of an additional washing process is eliminated.

The object of the invention is solved in that the supply bore is flushed at least temporarily with the electrolyte. The electrolyte liquid reaches the main bore through the electrode or by flowing past it. Because of the high flow velocity, the electrolyte liquid removes contaminants from the surface. Once the hollow space formation has reached the supply bore, the electrolyte liquid flows through the supply bore to the exterior. Because of the flow-through amount and the rate of flow, oil residues and other contaminants are flushed out. In order for the erosion of metal in the supply bore not to surpass a certain amount, the flow-through can be interrupted by closing the supply bore.

This new method makes it possible to save additional washing processes which incur considerable costs. Firstly, an enormous amount of time is saved because the assembly and the retooling required for the washing processes can be eliminated.

When the supply bore is kept open for a longer period of time, an asymmetric formation of the hollow space results because the entire flow pattern on which the shape of the hollow space depends is changed. A portion of the electrolyte liquid is removed through the supply bore so that the erosion at the side opposite the supply bore is slowed. The formation of asymmetric hollow spaces is advantageous for many applications. When it is desired to form the hollow space symmetrically, it is recommended to close the supply bore toward the end of the process so that a back formation of the asymmetry results. This effect can be explained in that the less strongly eroded locations are again more strongly eroded by the proximity to the electrode when the supply bore is closed.

According to one embodiment of the invention, the supply bore is flushed from the interior to the exterior. When the supply bore is flushed in this direction, not only are contaminants very effectively removed from the bore, but a surprising side effect results. The junction edge of the supply bore adjoining the hollow space is rounded by the electrolyte liquid flowing past it and the entire junction area is smoothed. This effect is the result of the high flow velocity and the eroding properties of the electrolyte liquid. A rounded and smoothed edge has the advantage that the entire workpiece is essentially more pressure-stable. This is important with respect to the future because the development of diesel engines continues to proceed in the direction of higher injection pressure of up to several thousand bar. This is thought to achieve an improved combustion of the fuel.

According to a further advantageous embodiment of the invention the electrolyte liquid is removed through the electrode and/or Introduced through the electrode. This embodiment of the invention ensures a uniform flow pattern which is of utmost importance for a fast and uniform formation of the hollow space. In order for the supply and removal of the electrolyte liquid to be carried out in an optimal way, the electrode is formed as a tube with beaded edges. The electrolyte liquid can thus pass unimpeded through the electrode.

In order to prevent that metal is removed at undesirable locations of the workpiece, these locations are protected by insulators. Accordingly, no electrolyte liquid can reach these locations, the workpiece remains thus undamaged there and maintains its original shape.

Contaminants in the electrolyte liquid affect the erosion behavior negatively. Accordingly, it is provided according to an especially advantageous embodiment that the electrolyte liquid is freed of contaminants. For example, oil and foam separators are employed.

In order to clearly structure the method and to separate individual processes from one another, according to a further advantageous embodiment of the invention it is provided that the manufacture of the workpiece is carried out in several partial steps.

According to an advantageous embodiment of the invention, it is provided that the electrolyte liquid flows through at least one opening in the insulator. With this measure an unimpeded removal or supply of the electrolyte liquid is ensured.

According to a further very advantageous embodiment of the invention, it is provided that the electrolyte liquid flows through at least one channel below the supply bore. This channel can be integrated in the insulator so that the electrolyte liquid can exit, for example, laterally. It is also conceivable that the channel is not integrated into the insulator. In this way, insulation material can be saved.

The invention will be explained in more detail with the aid of the drawings illustrating embodiments of the invention.

BRIEF DESCRIPTION OF THE DRAWINGS

It is shown in.

DETAILED DESCRIPTION OF THE PREFERRED EMBODIMENT

Figure 1:
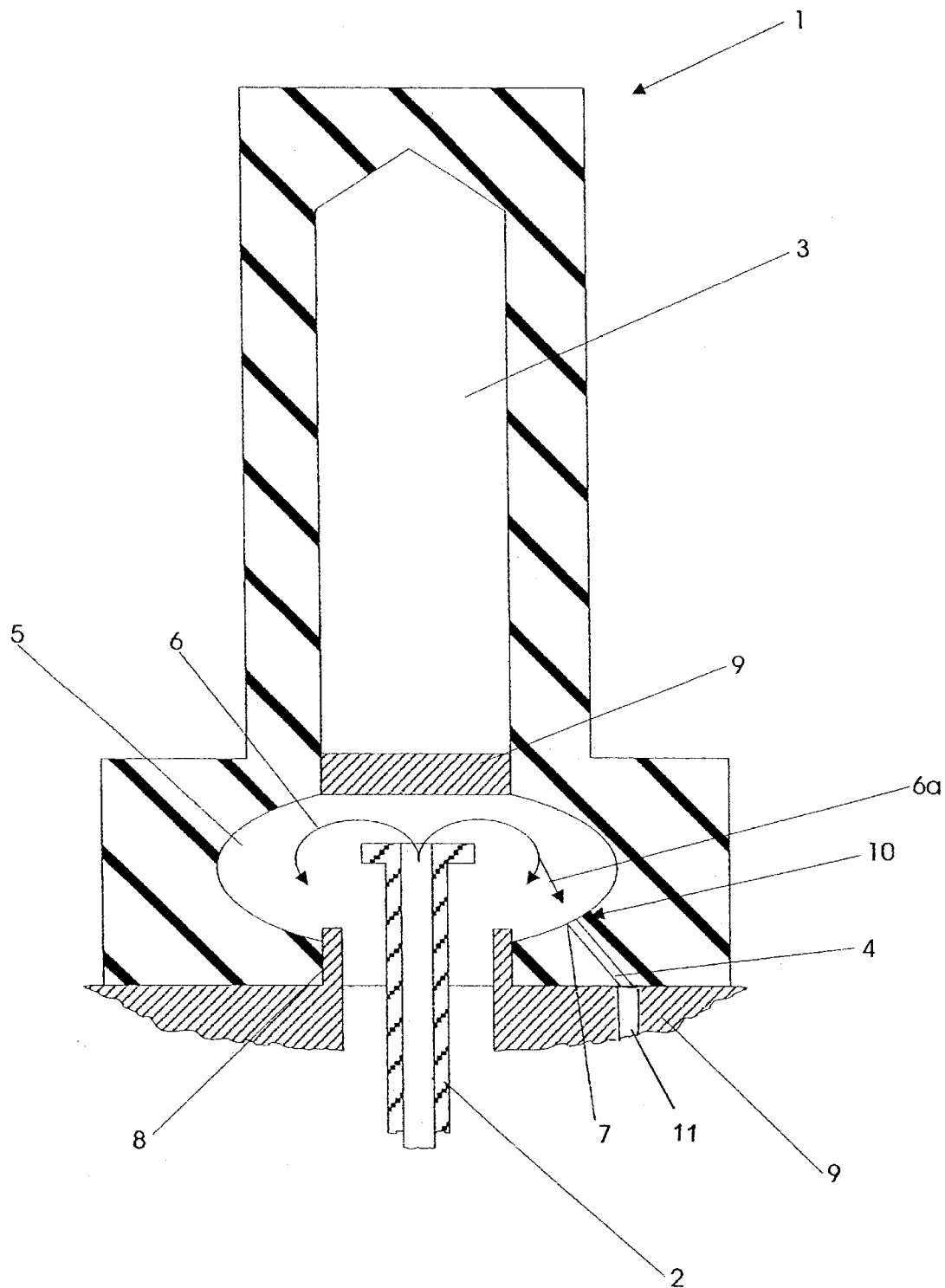
FIG. 1 a schematic representation of a workpiece with introduced electrode.

FIG. 1 shows a workpiece 1 in the form of an injector body with introduced electrode 2. In the workpiece 1 a main bore 3 and a supply bore 4 can be seen. The electrolyte liquid passes through the electrode 2 into the workpiece where a hollow space 5 is being formed. For this purpose, the electrode 2 is embodied as a tube with beaded edges. The arrows 6 indicate the flow direction of the electrolyte liquid. As can be seen in FIG. 1, a portion 6a of the electrolyte liquid flows through the supply bore 4. The junction edge 7 of the supply bore 4 into the hollow space 5 is rounded thereby and the entire junction area 10 is smoothed which is very advantageous with respect to a high pressure loading of the injector body in operation. Due to the flow-through of the electrolyte liquid through the supply bore 4, additional time-intensive and cost-intensive washing processes can be omitted. In order to prevent that the erosion of metal at undesirable locations 8 of the workpiece 1 will take place, these locations 8 are protected by insulators 9. Accordingly, no electrolyte liquid can reach these locations 8, the workpiece 1 remains undamaged there and maintains its original shape. The electrolyte liquid can flow out through an opening 11 in the insulator 9.

Figure 2:
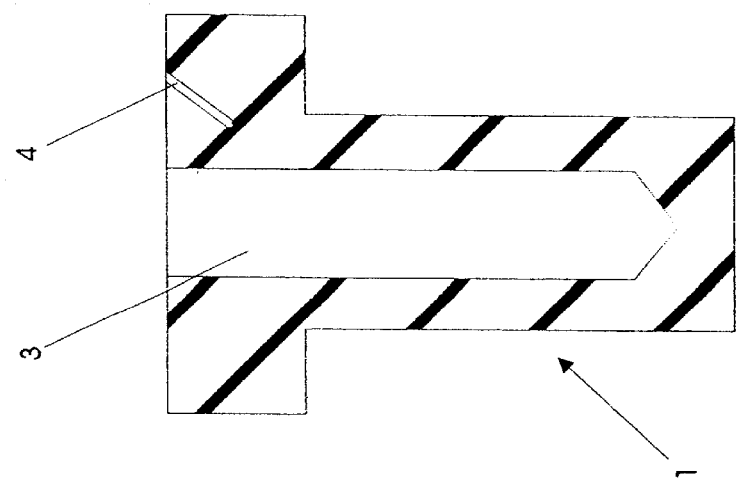
FIG. 2 a schematic representation of the workpiece after a first partial method step.

FIG. 2 shows a representation of the workpiece 1 after a first method step. It can be seen that a main bore 3 and a supply bore 4 have been produced in the workpiece 1. After this method step, it would now be required according to the prior art to perform additional washing processes.

Figure 3:
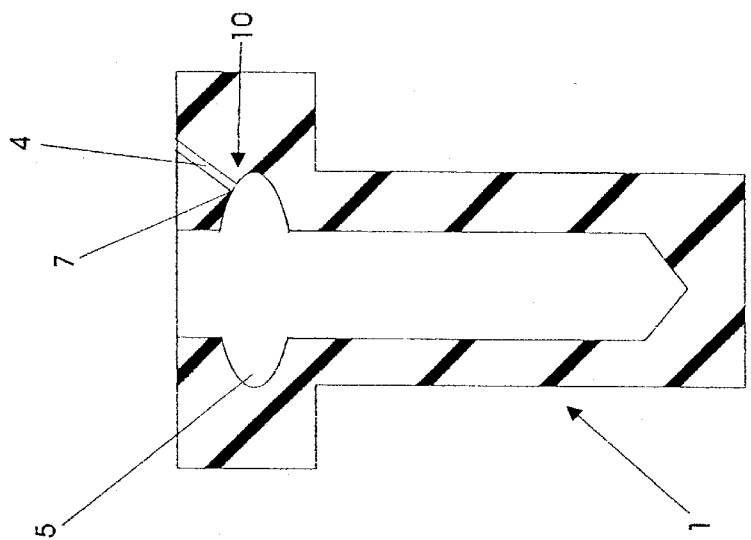
FIG. 3 a schematic representation of the workpiece after a second partial method step.

In FIG. 3, the workpiece 1 is shown after a second method step. The hollow space 5 is already formed to such an extent that a connection between the hollow space 5 and the supply bore 4 is present. The electrode 2 required for hollow space formation and the insulation 9 of partial portions 8 of the workpiece 1 have been left out in the FIGS. 2 through 4 in order to simplify the representation. The electrolyte liquid is supplied or removed via the electrode 2, not shown. Portions of the electrolyte liquid flow through the supply bore 4 and ensure a removal of the contaminants from the workpiece. At the same time, the junction edge 7 is rounded and the entire junction area 10 is smoothed.

Figure 4:
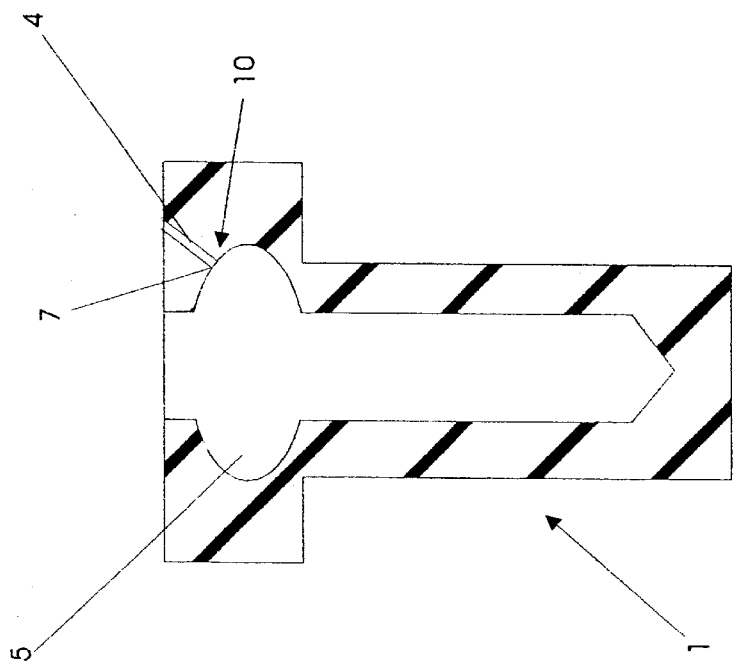
FIG. 4 a schematic representation of the workpiece after a third partial method step.

FIG. 4 shows the workpiece 1 after a third method step. The hollow space 5 is completed. The junction edge 7 is rounded and the junction area 10 is smoothed.

What is claimed is:

1. A method for manufacturing hollow spaces (5) in metallic workpieces (1), with at least one main bore (3) and at least one supply bore (4), wherein at least one electrode (2) is introduced into the main bore (3) and the hollow space (5) and/or the connection to the supply bore (4) is formed by means of an electrolytic erosion process, characterized in that the supply bore (4) is at least temporarily flushed with electrolyte liquid.

2. The method according to claim 1, characterized in that the flushing of the supply bore (4) is carried out from the interior to the exterior.

3. The method according to claim 1, characterized in that the electrolyte liquid is supplied and/or removed via the electrode (2).

4. The method according to claim 1, characterized in that portions (8) of the workpiece are protected by insulators (9).

5. The method according to claim 1, characterized in that contaminants are removed from the electrolyte liquid.

6. The method according to claim 1, characterized in that the manufacture of the workpiece is carried out in several partial steps.

7. The method according to claim 1, characterized in that the electrolyte liquid flows through at least one channel below the supply bore (4).

8. The method according to claim 1, wherein the electrolyte liquid flows through at least one opening in an insulator protecting portions of the workpiece.

* * * * *